United States Patent
Yamaguchi et al.

(10) Patent No.: US 8,988,732 B2
(45) Date of Patent: Mar. 24, 2015

(54) IMAGE PROCESSING APPARATUS AND IMAGE PROCESSING METHOD

(75) Inventors: Tomohiro Yamaguchi, Shinshiro (JP); Yoshihiko Hirota, Toyokawa (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 2116 days.

(21) Appl. No.: 10/662,443

(22) Filed: Sep. 16, 2003

(65) Prior Publication Data

US 2004/0125409 A1 Jul. 1, 2004

(30) Foreign Application Priority Data

Sep. 18, 2002 (JP) ................................ 2002-271511

(51) Int. Cl.
*H04N 1/409* (2006.01)
*H04N 1/40* (2006.01)

(52) U.S. Cl.
CPC ................................ *H04N 1/40062* (2013.01)
USPC ............ 358/2.1; 358/3.26; 358/1.9; 382/194; 382/205; 382/173; 382/260; 382/261; 347/15; 430/319; 430/5

(58) Field of Classification Search
USPC ............................ 358/2.1, 3.26; 382/260–261
See application file for complete search history.

(56) References Cited

U.S. PATENT DOCUMENTS

| 5,025,481 A * | 6/1991 | Ohuchi ......................... 382/176 |
| 6,198,841 B1 | 3/2001 | Toyama et al. |
| 6,268,935 B1 * | 7/2001 | Kingetsu et al. ............... 358/2.1 |
| 6,272,248 B1 * | 8/2001 | Saitoh et al. .................. 382/218 |
| 6,707,951 B1 * | 3/2004 | Suzuki et al. ................. 382/260 |

FOREIGN PATENT DOCUMENTS

| JP | A-2001-217967 | 8/2001 |
| JP | 2002-27242 | 1/2002 |

OTHER PUBLICATIONS

Apr. 17, 2007 Japanese Office Action issued in Japanese Application No. 2002-271511.

* cited by examiner

*Primary Examiner* — Quang N Vo
(74) *Attorney, Agent, or Firm* — Buchanan Ingersoll & Rooney PC

(57) ABSTRACT

In the image processing apparatus, image data is divided into large blocks of a prescribed size and the large blocks are subdivided into small blocks by the dividing unit. The number of isolated points in each large block is then calculated by the large block isolated point calculation unit, and the number of isolated points in each small block is then calculated by the small block isolated point calculation units. It is then determined by the halftone-dot region determination unit whether or not the large block is a halftone-dot region. This determination considers both the number of isolated points in the large block and the number of isolated points in each small block.

25 Claims, 6 Drawing Sheets

Input image    Isolated point

IMAGE PROCESSING APPARATUS AND IMAGE PROCESSING METHOD

CROSS-REFERENCE TO RELATED APPLICATIONS

This application is based on application No. 2002-271511 filed in Japan, the contents of which are hereby incorporated by reference.

BACKGROUND OF THE INVENTION

1. Field of the Invention

The present invention relates to an image processing apparatus that performs image processing, and more particularly, to an image processing apparatus that distinguishes image attributes, particularly halftone-dot regions, and performs image processing appropriate for such attributes.

2. Description of the Related Art

In the conventional art, when image processing apparatuses such as printers perform printing or other processing of halftone-dot regions, the phenomenon of moiré can occur. As a result, the occurrence of moiré has been prevented by extracting halftone-dot regions from the image data and carrying out smoothing regarding the extracted halftone-dot regions. As a process for extracting halftone-dot regions from image data, a process has been proposed wherein the image data is divided into blocks having a prescribed range and it is determined whether the characteristics of each block correspond to those of a halftone-dot region (Japanese Laid-Open Patent Application 2002-27242).

However, the following problem exists in connection with the conventional image processing apparatus described above. Namely, the image data may include figures that are determined to be isolated points, depending on the character configuration. In particular, in the case of small-sized characters (particularly characters that are 5-point or smaller), areas bordered by lines can be detected as white isolated points. Furthermore, the dot in the letter 'i' or the small lines at the bottom in such characters as the Japanese character 焦 may be detected as black isolated points. In addition, a dot formed by the intersection of lines may also be detected as a black isolated point. A region in which these characters are concentrated may be incorrectly determined to be a halftone-dot region even if it is not. Furthermore, because smoothing is carried out to such erroneously determined regions, the sharpness of the characters contained therein may deteriorate.

Specifically, in a halftone-dot region in which isolated points are distributed evenly as shown in FIG. 7, 12 isolated points are extracted from the block shown in FIG. 7. On the other hand, in a character region, three of the characters 田 in a small point size may be concentrated in a single block, as shown in FIG. 8. In this situation, four white isolated points are extracted for each character 田. Consequently, from this character region, a total of 12 isolated points are extracted from the three characters. As a result, when the determination of whether or not a halftone-dot region exists is based on the number of isolated points, because the block in FIG. 8 contains the same number of isolated points as the halftone-dot region in FIG. 7, it is erroneously determined to be a halftone-dot region even though it is in fact a character region.

OBJECTS AND SUMMARY

The present invention was created in order to resolve the problem with the technology of the prior art identified above. In other words, an object of the present invention is to provide an image processing apparatus that minimizes deterioration in output image quality by appropriately distinguishing the attributes of image areas, particularly halftone-dot regions, and performing processing properly suited to such areas.

The image processing apparatus constituting a first aspect of the present invention is an image processing apparatus that handles image data, comprising: a dividing unit which divides image data into large blocks of a prescribed size and further subdivides these large blocks into multiple smaller blocks; a large block isolated point calculation unit which calculates the number of isolated points contained in each large block established by the dividing unit; a small block isolated point calculation unit which calculates the number of isolated points contained in each small block established by the dividing unit; and a halftone-dot region determination unit which determines whether or not a large block is a halftone-dot region based on the number of isolated points calculated by the large block isolated point calculation unit and the number of the isolated points calculated by the small block isolated point calculation unit.

In this image processing apparatus, the large blocks are subdivided by the dividing unit into small blocks. The number of isolated points in each large block is then calculated by the large block isolated point calculation unit, and the number of isolated points in each small block is then calculated by the small block isolated point calculation unit. It is then determined by the halftone-dot region determination unit whether or not the large block is a halftone-dot region. This determination considers both the number of isolated points in the large block and the number of isolated points in each small block. In other words, for a large block to be determined a halftone-dot region, not only must the number of isolated points in the large block satisfy the condition for determination as a halftone-dot region, but the number of isolated points in each small block must also satisfy the condition for a halftone-dot region. This allows region attributes to be distinguished in more detail and reduces the risk of an erroneous region attribute determination.

The image processing apparatus of a second aspect of the present invention is an image processing apparatus that handles image data, comprising: a dividing unit which divides image data into multiple small blocks; a small block isolated point calculation unit which calculates the number of isolated points contained in each small block established by the dividing unit; a large block isolated point calculation unit which calculates the number of isolated points contained in a large block composed of multiple smaller blocks based on the small block isolated point totals calculated by the small block isolated point calculation unit; and a halftone-dot region determination unit which determines whether or not a large block is a halftone-dot region based on the number of isolated points calculated by the large block isolated point calculation unit and the number of isolated points calculated by the small block isolated point calculation unit. The effect described above can be obtained in this case as well.

Furthermore, in these aspects of the present invention, it is preferred that the halftone-dot region determination unit determine that a large block is a halftone-dot region if the number of isolated points in the large block equals or exceeds a first prescribed value and the number of isolated points in each small block contained in the large block equals or exceeds a second prescribed value. Where a large block is a halftone-dot region, the isolated points are often evenly distributed. On the other hand, in the case of character regions, it is extremely rare for the isolated points to be evenly distributed. In other words, the halftone-dot region determination unit appropriately extracts halftone-dot regions based on such characteristics. Incidentally, the second prescribed value is smaller than the first prescribed value.

The image processing method of a third aspect of the present invention is an image processing method that handles image data and includes the following steps: (1) dividing image data into large blocks of a prescribed size and further subdividing these large blocks into multiple smaller blocks; (2) calculating the number of isolated points contained in the large block established via division and the number of isolated points contained in the small blocks established via division; and (3) determining whether or not the large block is a halftone-dot region based on the calculated number of large block isolated points and the calculated number of small block isolated points.

The image processing method of a fourth aspect of the present invention is an image processing method that handles image data and includes the following steps: (1) dividing image data into multiple small blocks; (2) calculating the number of isolated points contained in each small block established via division; (3) calculating the number of isolated points contained in a large block composed of multiple smaller blocks based on the calculated number of small block isolated points; and (4) determining whether or not the large block is a halftone-dot region based on the calculated number of large block isolated points and the calculated number of small block isolated points.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
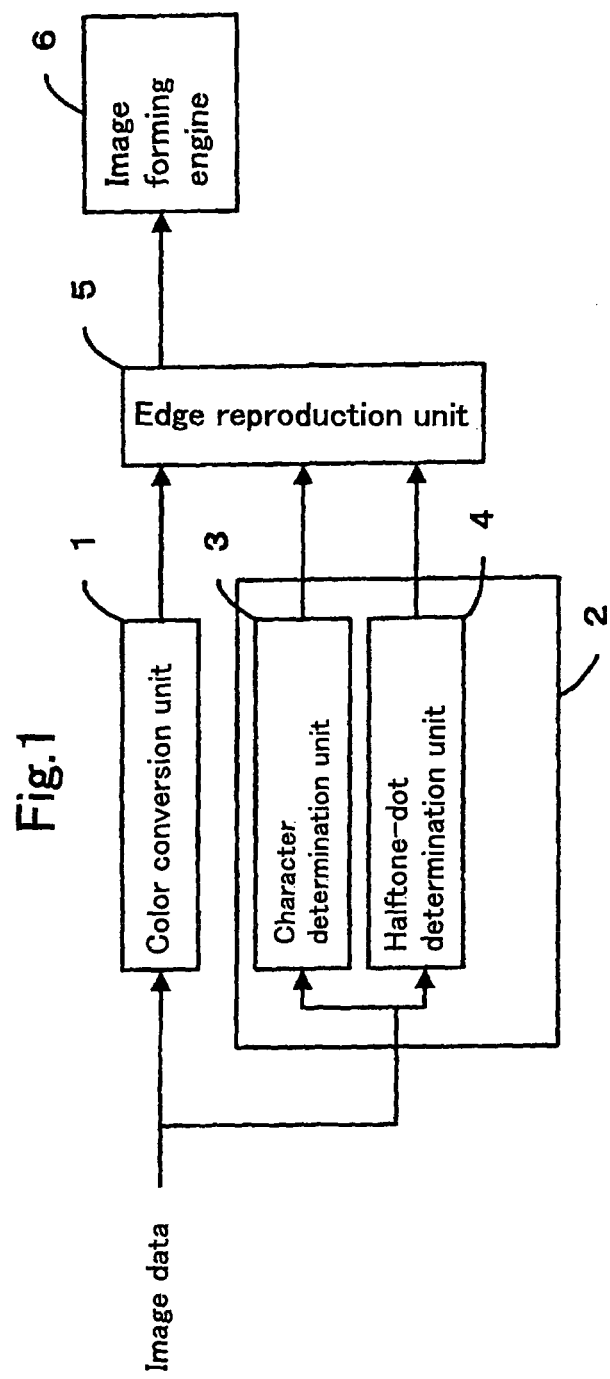
FIG. 1 is a block diagram showing the functions of an image processing apparatus of an embodiment of the present invention.

A specific embodiment of the image processing apparatus pertaining to the present invention will be explained below with reference to the drawings. This embodiment takes the form of an image forming apparatus. The image processing apparatus of this embodiment has a color conversion unit 1, a region determination unit 2, an edge reproduction unit 5 and an image forming engine 6, as shown in FIG. 1. The region determination unit 2 has a character determination unit 3 and a halftone-dot determination unit 4. The color conversion unit 1, character determination unit 3 and halftone-dot determination unit 4 receive input of image data.

The various constituent components shown in FIG. 1 will now be described. The color conversion unit 1 converts input image data from RGB input system signals to CMYK output system signals, for example. At the same time, the region determination unit 2 determines the attributes of the regions comprising the input image data. The character determination unit 3 of the region determination unit 2 determines the existence of character regions (regions containing fine lines) in the input image data and generates a signal for each pixel indicating whether or not the pixel is a character region. Similarly, the halftone-dot determination unit 4 of the region determination unit 2 determines the existence of halftone-dot regions and generates signals indicating whether or not each pixel is a halftone-dot region. The edge reproduction unit 5 carries out correction processing such as edge enhancement and smoothing to the image data output by the color conversion unit 1 in accordance with the signals output from the region determination unit 2. The image forming engine 6 forms images on a medium such as paper based on the image data output by the edge reproduction unit 5. The image forming engine 6 may use any method to form images based on image data, including the electrophotographic method that employs a photosensitive body and toner or the inkjet method.

Figure 2:
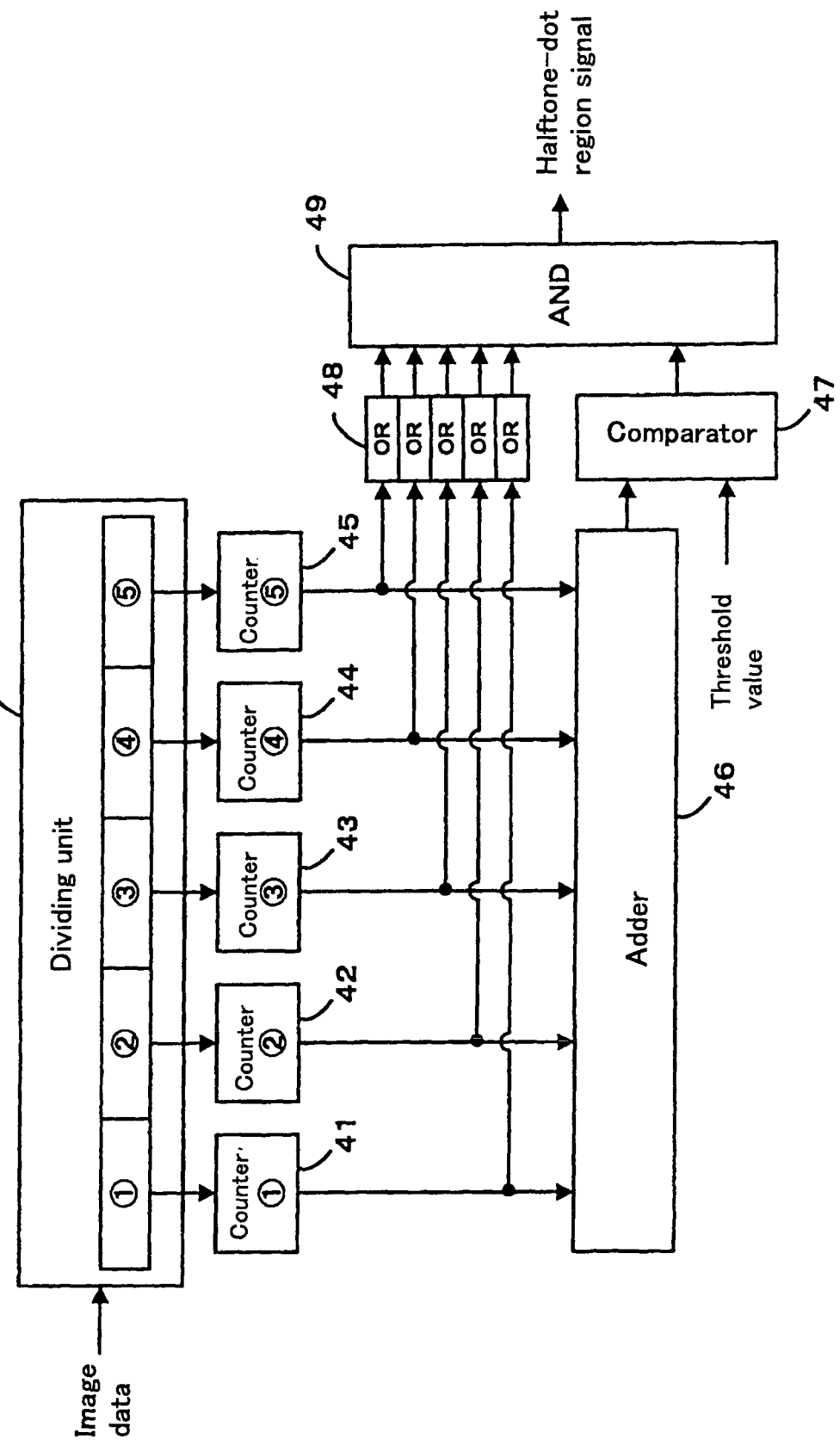
FIG. 2 is a block diagram showing the functions of a halftone-dot determination unit.

The halftone-dot determination unit 4 will now be described. As shown in FIG. 2, the halftone-dot determination unit 4 includes a dividing unit 40, isolated point counters 41, 42, 43, 44 and 45, an adder 46, a comparator 47, an OR circuit 48 and an AND circuit 49. The dividing unit 40 divides the image area into blocks (hereinafter termed 'large blocks') having a size of M×N pixels, and further divides these large blocks into smaller blocks (hereinafter termed 'small blocks') having a size of (i)×(j) pixels. The isolated point counters each count the number of isolated points in a small block. The adder 46 adds up the total number of isolated points counted by the isolated point counters 41-45 and deems this number the number of isolated points in a large block. The comparator 47 compares the number of large block isolated points with a threshold value. The image processing apparatus of this embodiment divides the large block into five small blocks ①  through ⑤, and includes the isolated point counters 41-45 that correspond to these small blocks. The sizes of the small and large blocks may be set appropriately in accordance with the type of halftone-dot region to be detected. For example, the small blocks may be set at 5×5 pixels and the large blocks set at 5×25 pixels.

Figure 3:
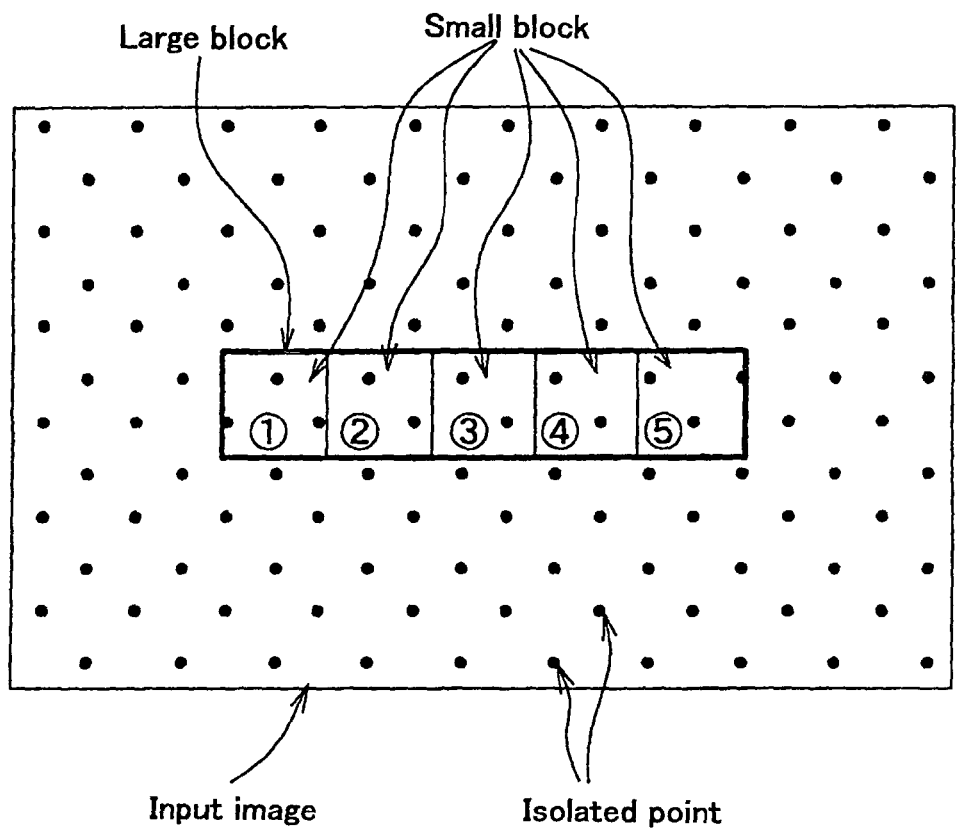
FIG. 3 is a conceptual drawing showing a large block and small blocks in a halftone-dot region.

The operation of the halftone-dot determination unit 4 will now be described. First, the image data is sent to the dividing unit 40. The sent image data is divided into large blocks by the dividing unit 40. The large blocks are then further divided into five small blocks. In other words, each large block is divided into five contiguous small blocks ① through ⑤ by being divided into five sections as shown in FIG. 3. The image data for each small block is sent to the isolated point counter 41-45 corresponding to that small block.

The number of isolated points is counted for each region by the respective isolated point counters 41-45 and the number of isolated points is obtained for each region. For example, for the image data shown in FIG. 3, the number of isolated points in the small block ① is counted by the isolated point counter 41. Because three isolated points exist in the small block ①, the number of isolated points in the small block ① is '3'. The number of small block isolated points obtained by the five isolated point counters is then sent to the adder 46 and the OR circuit 48.

The total number of isolated points in the small blocks ① through ⑤ is then calculated by the adder 46, and the number of isolated points in the large block is thereby obtained. For example, for the image data shown in FIG. 3, the two or three isolated points present in each of the small blocks are counted by the corresponding isolated point counter, and the total of twelve is obtained as the number of isolated points in the large block. This number of large block isolated points is then sent to the comparator 47.

The comparator 47 compares the number of large block isolated points that it has received with a prescribed threshold value. If the number of large block isolated points exceeds the threshold value, the comparator 47 sends an 'H' signal to the AND circuit 49, while if the number of large block isolated points is less than the threshold value, the comparator 47 sends an 'L' signal to the AND circuit 49.

If the output value from all of the isolated point counters 41-45 is '0', the OR circuit 48 outputs an 'L' signal to the AND circuit 49, while if any other value is obtained, OR circuit 48 outputs an 'H' signal to the AND circuit 49. In other words, where the input number of isolated points is expressed as a binary number, if any '1' component is contained in the binary number, 'H' is output. Therefore, if no isolated points exist in the small block, 'L' is output, while if even one isolated point is counted, 'H' is out put. In addition, the OR circuit 48 performs calculation for each isolated point counter (small block) and sends the result to the AND circuit 49.

Figure 4:
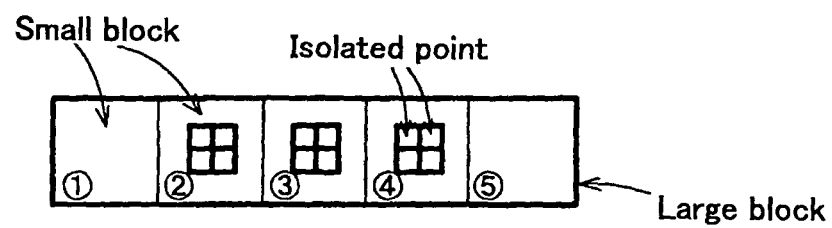
FIG. 4 is a conceptual drawing showing a large block and small blocks in a character region.

Next, a halftone-dot region signal is output by the AND circuit 49 based on the output result from the OR circuit 48 and the output result from the comparator 47. Specifically, where the output value from the comparator 47 is 'H' and all values output from the OR circuit 48 are 'H', a halftone-dot region signal indicating that the region constituting this large block is a halftone-dot region is output. Here, in the case of a halftone-dot region, there is a high probability that the isolated points in an area of at least a certain size will be distributed evenly within that area, as shown in the image of FIG. 3. On the other hand, in the case of a character region, it is extremely unlikely that the isolated points in an area of at least a certain size will be distributed evenly within that area, and even in an area having contiguous characters, such an even distribution over a large area is highly unlikely, as shown in the image of FIG. 4. In other words, the halftone-dot determination unit 4 extracts halftone-dot regions based on these region characteristics.

A specific example will be described based on the image data shown in FIG. 3 (halftone-dot region) and FIG. 4 (character region). Here, the threshold value to which the number of large block isolated points is compared (used by the comparator 47 in FIG. 2) is a number smaller than 12. First, in the image data shown in FIG. 3, there are 12 isolated points in the large block, and 'H' is output by the comparator 47. Furthermore, two or three isolated points are present in each small block, and the values output from the OR circuit 48 are all 'H'. Therefore, a halftone-dot region signal indicating that the region constituting this large block is a halftone-dot region is output by the AND circuit 49. Similarly, in the image data shown in FIG. 4, there are 12 isolated points in the large block, and 'H' is output by the comparator 47. However, two of the small blocks (the small blocks ① and ⑤ in FIG. 4) contain no isolated points. Therefore, the values output by the OR circuit 48 include 'L'. Accordingly, regardless of the output result from the comparator 47, the AND circuit 49 outputs a halftone-dot region signal indicating that the area constituting the large block is not a halftone-dot region.

Figure 5:
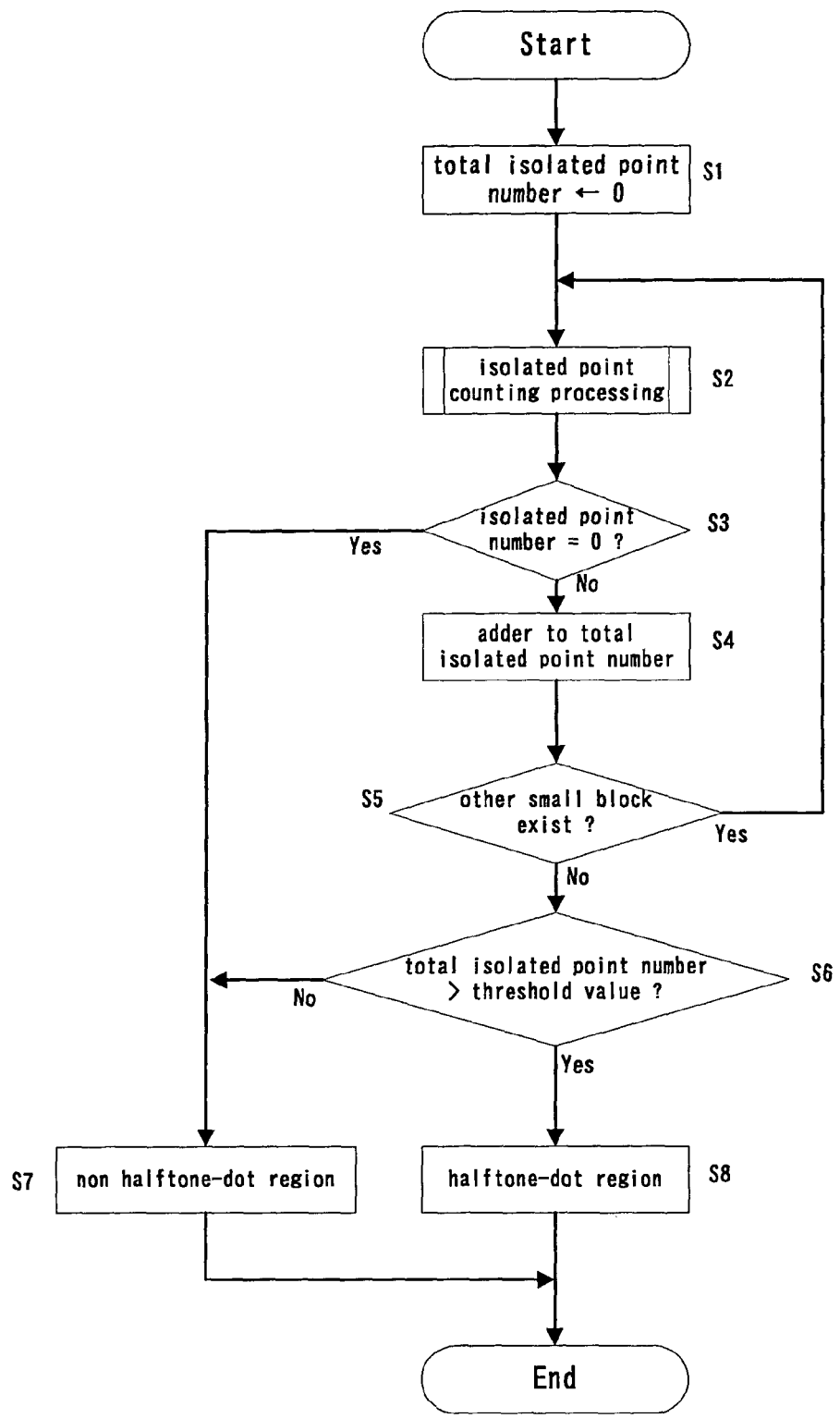
FIG. 5 is a flow chart of the operations executed by the halftone-dot determination unit.

The processing executed by the halftone-dot determination unit 4 will now be described using the flow chart shown in FIG. 5. First, the total number of isolated points in the large block (hereinafter termed the 'total isolated points') is initialized (S1). In this initialization, processing to divide the image data into large blocks and small blocks is carried out. The number of isolated points in any particular small block is then sought (S2). It is then determined whether or not the number of isolated points obtained in step S2 was '0' (S3). If the number of isolated points was '0' (YES in S3) it is determined that the large block is not a halftone-dot region (S7), and the routine ends. If the number of isolated points was not '0', on the other hand (NO in S3), the counted number of small block isolated points is added to the total isolated points (S4). It is then determined whether or not there are any other small blocks for which the number of isolated points has not yet been sought (S5). If other such small blocks exist (YES in S5), the operations beginning with step S2 are repeated regarding these small blocks. If no other small blocks exist, on the other hand (NO in S5), it is determined whether or not the total isolated points exceeds a threshold value (S6). If the total isolated points is larger than the threshold value (YES in S6), it is determined that the large block is a halftone-dot region (S8) and the routine ends. If the threshold value is larger than the total isolated points, however (NO in S6), it is determined that the large block is not a halftone-dot region (S7) and the routine ends.

Figure 6:
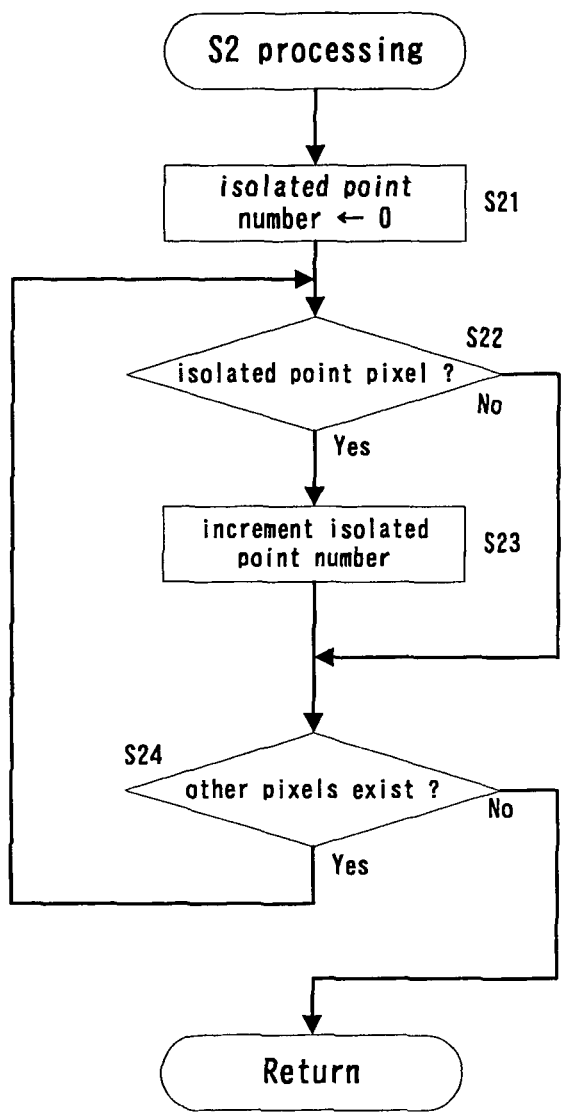
FIG. 6 is a flow chart of the isolated point counting operation.
Figure 7:
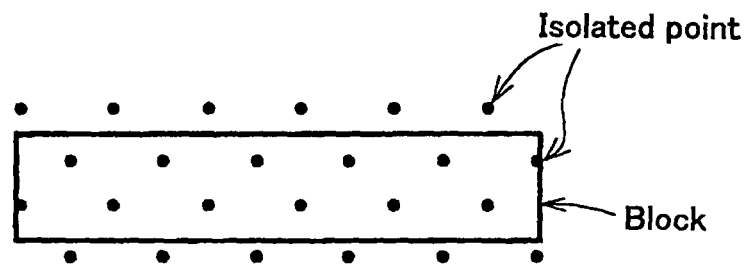
FIG. 7 is a drawing showing the isolated points in a halftone-dot region according to the conventional art.
Figure 8:
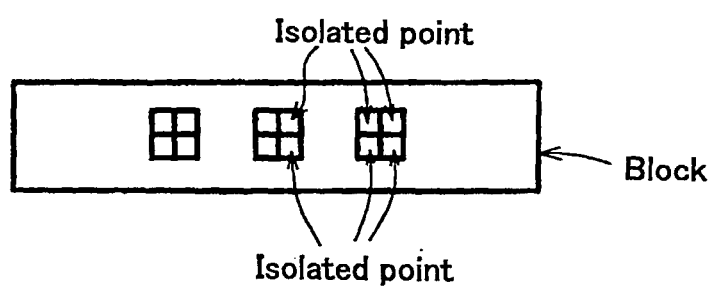
FIG. 8 is a drawing showing the isolated points in a character region according to the conventional art.

The operation (S2) by which the number of isolated points is sought will now be described with reference to the flow chart of FIG. 6. First, the number of isolated points is initialized (S21). It is then determined whether or not the selected pixel is a pixel that displays an isolated point (hereinafter termed an 'isolated point pixel') (S22). If it is an isolated point pixel (YES in S22), the number of isolated points is increased by one (S23). If the selected pixel is not an isolated point pixel, on the other hand (NO in S22), or after the operation of S23 is completed, it is determined whether or not other pixels exist in that small block as to which isolated point pixel determination has not been performed (S24). If such other pixels exist (YES in S5), the operations beginning with step S22 are repeated for such pixels. If no other such pixels exist, however (NO in S5), the routine ends.

Because various methods are known in the art for determining the existence of isolated point pixels (S22), details thereof will be omitted here, but it is acceptable if, for example, using a filter of 3×3 pixels centered on the focus pixel, it is determined that the focus pixel is an isolated point pixel where the focus pixel is a black pixel and all of the pixels surrounding the focus pixel are white pixels. Furthermore, although in this example black isolated points are sought, the accuracy of halftone-dot determination is improved by seeking white isolated points as well. In determining the existence of white isolated points, it is acceptable if, for example, using a filter of 3×3 pixels centered on the focus pixel, it is determined that the focus pixel is an isolated point pixel where the focus pixel is a white pixel and all of the pixels surrounding the focus pixel are black pixels.

The dividing unit 40 of this embodiment divides into small blocks the large blocks previously obtained via division, but it may instead first divide the entire image data into small blocks and then aggregate the small blocks into large blocks. In this case, after the image data is divided into small blocks, areas of a certain size formed by contiguous small blocks are deemed large blocks.

The edge reproduction unit 5 performs smoothing based on halftone-dot region signals. The areas to which smoothing is performed are halftone-dot regions, and smoothing is not performed to other areas, i.e., character regions. The image forming engine 6 forms images based on the image data that underwent smoothing by the edge reproduction unit 5.

As described in detail above, in this embodiment, the image data input by the dividing unit 40 is divided into large blocks and small blocks. The number of isolated points in each of the various small blocks is then calculated by the isolated point counters 41-45. The adder 46 calculates the number of large block isolated points by adding together the number of isolated points counted by each of the isolated point counters. The comparator 47 compares the number of large block isolated points with a threshold value. The number of isolated points obtained by each isolated point counter is sent to the AND circuit 49 via the OR circuit 48. In other words, data indicating whether or not isolated points exist in each small block is sent. The AND circuit 49 determines that the large block is a halftone-dot region only where the large block isolated point total exceeds a threshold value and isolated points exist in each of the small blocks comprising the large block, and this result is output as a halftone-dot region signal. This is because the probability that the large block is not a halftone-dot region is high where the large block includes at least one small block that contains no isolated points. As a result, erroneous region determination can be minimized. Therefore, an image processing apparatus offering minimal deterioration in output image quality can be realized by appropriately determining the attributes of each area within the image data and carrying out appropriate processing for each area.

This embodiment constitutes a mere example of the present invention, which is not limited in any way thereby. Therefore the present invention may naturally be modified or improved in various ways within the essential scope of the invention. For example, the image forming destination for the image processing apparatus is not limited to paper, and such image forming may be carried out on a display device such as a personal computer.

In this embodiment, the large blocks were formed with a horizontal orientation as shown in the drawings, but the present invention is not limited to this implementation. In other words, the large blocks may be oriented both horizontally and vertically. However, where the large blocks are oriented both horizontally and vertically, the burden on the memory and the processing system increases, and therefore it is preferred that they be divided in one direction only.

In this embodiment, the number of isolated point(s) for each of the small blocks was sent to the OR circuit 48, but the present invention is not limited to this implementation. In other words, it is not necessary that the small blocks for which the isolated point totals are sent consist of all small blocks or even contiguous small blocks. It is acceptable if areas that are away from each other in a large block are extracted for final halftone-dot determination. For example, it is acceptable if the small blocks ①, ③ and ⑤ are extracted from the image data shown in FIG. 3 and the number of isolated points for only these small blocks is sent to the OR circuit 48.

In this embodiment, the isolated point totals counted by the isolated point counters are sent to the AND circuit 49 via all of the OR circuits 48, but the present invention is not limited to this implementation. In other words, it is acceptable if a single 'H' signal is output when isolated points exist in all of the small blocks, while an 'L' signal is output when any small block does not contain any isolated points, and the AND circuit 49 outputs a halftone-dot region signal based on the signal output from the OR circuit 48 and the signal output from the comparator 47.

As is clear from the above description, according to the present invention, by appropriately determining the attributes of areas of the image data and executing appropriate processing with respect to such areas, an image processing apparatus offering minimal deterioration in output image quality can be provided.

Although the present invention has been fully described by way of examples with reference to the accompanying drawings, it is to be noted that various changes and modifications will be apparent to those skilled in the art. Therefore, unless such changes and modifications otherwise depart from the scope of the present invention, they should be construed as being included herein.

What is claimed is:

1. An image processing apparatus that handles image data, comprising:
    a dividing unit for dividing image data into large blocks of a prescribed size and further subdividing the large blocks into multiple smaller blocks;
    a large block isolated point calculation unit for calculating a first number of isolated points contained in each large block established by said dividing unit;
    a small block isolated point calculation unit for calculating a respective second number of isolated points contained in each small block established by said dividing unit; and
    a halftone-dot region determination unit for determining that a specified large block among the large blocks established by the dividing unit is a halftone-dot region if all small blocks in the specified large block have an isolated point contained therein, based on the respective second numbers calculated by the small block isolated point calculation unit, and if the first number of isolated points calculated to be contained in the specified large block by the large block isolated point calculation unit is greater than or equal to a first prescribed value.

2. An image processing apparatus as claimed in claim 1, wherein said halftone-dot region determination unit is operable to determine that the specified large block is a halftone-dot region if the respective second number of isolated points in each small block contained in the large block is greater than or equal to a second prescribed value.

3. An image processing apparatus as claimed in claim 2, wherein the second prescribed value is smaller than the first prescribed value.

4. An image processing apparatus as claimed in claim 1, further comprising:
    an image processing unit for correcting the image data based on the results of determination by said halftone-dot region determination unit.

5. An image processing apparatus as claimed in claim 4, further comprising:
    an image forming unit for performing image formation based on the image data corrected by said image processing unit.

6. An image processing apparatus that handles image data, comprising:
    a dividing unit for dividing image data into multiple small blocks;
    a small block isolated point calculation unit for calculating a respective first number of isolated points contained in each small block established by said dividing unit;
    a large block isolated point calculation unit for calculating a second number of isolated points contained in a large block of the image data, the large block being composed of multiple smaller blocks based on an aggregated amount of the respective first number of isolated points calculated by said small block isolated point calculation unit; and a halftone-dot region determination unit for determining that the large block is a halftone-dot region if all small blocks in the large block have an isolated point contained therein, based on the respective first number of isolated points calculated by the small block calculation unit, and if the second number of isolated points calculated to be contained in the large block by the large block isolated point calculation unit is greater than or equal to a first prescribed value.

7. An image processing apparatus as claimed in claim 6, wherein said halftone-dot region determination unit is operable to determine that the respective first number of isolated points in each small block contained in the large block is greater than or equal to a second prescribed value.

8. An image processing apparatus as claimed in claim 7, wherein the second prescribed value is smaller than the first prescribed value.

9. An image processing apparatus as claimed in claim 6, further comprising:
an image processing unit for correcting the image data based on the results of determination by said halftone-dot region determination unit.

10. An image processing apparatus as claimed in claim 9, further comprising:
an image forming unit for performing image formation based on the image data corrected by said image processing unit.

11. An image processing method that handles image data, said method comprising the steps of:
dividing, in processing circuitry of an image processing apparatus, image data into large blocks of a prescribed size and further subdividing the large blocks into multiple smaller blocks;
calculating, in the processing circuitry of the image processing apparatus, a first respective number of isolated points contained in each large block established via division and a respective second number of isolated points contained in each small block established via division; and
determining, in the processing circuitry of the image processing apparatus, that a specified large block among the large blocks established via division is a halftone-dot region if all small blocks in the specified large block have an isolated point contained therein, based on the calculated respective second numbers of each small block contained in the specified large block, and if the first number of isolated points calculated to be contained in the specified large block is greater than or equal to a first prescribed value.

12. An image processing method as claimed in claim 11, wherein said determining step comprises determining that the specified large block is a halftone-dot region if the respective second number of isolated points in each small block contained in the large block is greater than or equal to a second prescribed value.

13. An image processing method as claimed in claim 12, wherein the second prescribed value is smaller than the first prescribed value.

14. An image processing method that handles image data, said method comprising the steps of:
dividing, in processing circuitry of the image processing apparatus, image data into multiple small blocks;
calculating, in the processing circuitry of the image processing apparatus, a respective first number of isolated points contained in each small block established via division;

calculating, in the processing circuitry of the image processing apparatus, a respective second number of isolated points contained in a large block of the image data, the large block being composed of multiple smaller blocks based on the calculated number of small block isolated points; and
determining, in the processing circuitry of the image processing apparatus, that the large block is a halftone-dot region if all small blocks in the large block have an isolated point contained therein, based on the calculated respective first number of isolated points in the small blocks contained in the large block, and if calculated second number of isolated points contained in the large block is greater than or equal to a first prescribed value.

15. An image processing method as claimed in claim 14, wherein said determining step comprises determining that the large block is a halftone-dot region if the respective first number of isolated points in each small block contained in the large block is greater than or equal to a second prescribed value.

16. An image processing method as claimed in claim 15, wherein the second prescribed value is smaller than the first prescribed value.

17. An image processing apparatus as claimed in claim 5, further comprising a character determination unit for determining whether at least one character region exists in the image data, wherein:
said image processing unit is operable to correct the image data based on the results of determination by said halftone-dot region determination unit and said character determination unit; and
said image forming unit is operable to perform image formation based on the image data corrected by said image processing unit.

18. An image processing apparatus as claimed in claim 1, wherein said small block isolated point calculation unit comprises a plurality of isolated point counters respectively corresponding to the multiple small blocks contained in a large block, each of said plurality of isolated point counters being operable to count the respective second number of isolated points contained in a corresponding one of the small blocks contained in the large block.

19. An image processing apparatus as claimed in claim 18, wherein said halftone-dot region determination unit comprises:
a first determination unit for determining whether the calculated first number of isolated points in a large block equals or exceeds the first threshold value;
a second determination unit for determining whether each of said plurality of isolated point counters of said small block isolated point calculation unit have each counted at least one isolated point in the corresponding small block contained in the large block; and
a third determination unit for determining whether the large block is a halftone-dot region based on the determination results of said first determination unit and second determination unit.

20. An image processing apparatus as claimed in claim 19, wherein said third determination unit is operable to determine that the large block is a halftone-dot region if said first determination unit determines that the calculated first number of isolated points in the large blocks equals or exceeds the first threshold value, and said second determination unit determines that each of said isolated point counters have counted at least one isolated point in the corresponding small block contained in the large block.

21. An image processing apparatus as claimed in claim 6, wherein the second number of isolated points contained in the large block equals an aggregate of the respective first number of isolated points that said small block isolated point calculation unit calculates for each small block composing the large block.

22. An image processing apparatus as claimed in claim 6, wherein said large block isolated point calculation unit is operable to calculate the second number of isolated points contained in the large block by calculating an aggregate of the respective first number of isolated points contained in a plurality of contiguous small blocks within a predetermined area of the image data.

23. An image processing apparatus as claimed in claim 9, further comprising a character determination unit for determining whether at least one character region exists in the image data, wherein:

said image processing unit is operable to correct the image data based on the results of determination by said half-tone-dot region determination unit and said character determination unit; and said image forming unit is operable to perform image formation based on the image data corrected by said image processing unit.

24. An image processing method as claimed in claim 11, further comprising the steps of:

correcting the image data based on the results of determination of said determining step; and forming images based on the corrected image data.

25. An image processing method as claimed in claim 14, further comprising the steps of:

correcting the image data based on the results of determination of said determining step; and forming images based on the corrected image data.

\* \* \* \* \*